(12) United States Patent
Kim et al.

(10) Patent No.: US 7,693,077 B2
(45) Date of Patent: Apr. 6, 2010

(54) METHOD FOR ESTIMATING AVAILABLE BANDWIDTH OF NETWORK

(75) Inventors: Chan-Yul Kim, Bucheon-si (KR);
Jun-Ho Koh, Suwon-si (KR);
Jong-Kwon Kim, Gunpo-si (KR)

(73) Assignee: Samsung Electronics Co., Ltd.,
Suwon-Si, Gyeonggi-Do (KR)

( * ) Notice: Subject to any disclaimer, the term of this patent is extended or adjusted under 35 U.S.C. 154(b) by 860 days.

(21) Appl. No.: 11/147,640

(22) Filed: Jun. 8, 2005

(65) Prior Publication Data

US 2006/0045023 A1    Mar. 2, 2006

(30) Foreign Application Priority Data

Aug. 31, 2004    (KR) .................... 10-2004-0069164

(51) Int. Cl.
*H04B 7/216*    (2006.01)

(52) U.S. Cl. ................ 370/241; 370/229; 370/252; 370/249

(58) Field of Classification Search ............ 370/229, 370/241, 249, 252
See application file for complete search history.

(56) References Cited

U.S. PATENT DOCUMENTS

| | | | |
|---|---|---|---|
| 6,505,034 B1 * | 1/2003 | Wellig | 455/69 |
| 6,600,735 B1 * | 7/2003 | Iwama et al. | 370/352 |
| 6,643,496 B1 * | 11/2003 | Shimoyama et al. | 455/69 |
| 6,907,460 B2 * | 6/2005 | Loguinov et al. | 709/224 |
| 7,272,134 B2 * | 9/2007 | Iwama et al. | 370/352 |
| 2003/0053419 A1 * | 3/2003 | Kanazawa et al. | 370/252 |

(Continued)

FOREIGN PATENT DOCUMENTS

JP        10-023043        1/1998

(Continued)

OTHER PUBLICATIONS

Jain, M., et al.; "End-To-End Available Bandwidth: Measurement Methodology, Dynamics, and Relation with TCP Throughput;" IEEE/ACM Transactions on Networking, vol. 11, Issue 4; Aug. 2003.

*Primary Examiner*—Christopher Kelley
*Assistant Examiner*—Mulugeta Mengesha
(74) *Attorney, Agent, or Firm*—Cha & Reiter, LLC

(57) ABSTRACT

Disclosed is a method for estimating an available bandwidth of a network. A plurality of periodic time-stamp packets are transmitted to a receiving-party communication apparatus, which is connected to the network, through the network at a currently-set test transmission rate, and then a changing tendency of transmission delay time differences between the time-stamp packets is checked on the basis of reception times at which the receiving-party communication apparatus have received the respective time-stamp packets. When the transmission delay time differences are located outside a stable range and show a tendency to increase, the test transmission rate is set to a decreased value and the time-stamp packets are repeatedly transmitted at the decreased rate and when the transmission delay time differences are located outside the stable range and show a tendency to decrease, the test transmission rate is set to be an increased value and the time-stamp packets are repeatedly transmitted at the increased rate. A test transmission rate is determined as the available bandwidth when the transmission delay time differences are within the stable range.

10 Claims, 4 Drawing Sheets

U.S. PATENT DOCUMENTS

| | | | |
|---|---|---|---|
| 2003/0235187 A1* | 12/2003 | Iwama et al. | 370/352 |
| 2004/0001511 A1* | 1/2004 | Matta | 370/468 |
| 2004/0233912 A1* | 11/2004 | Droz et al. | 370/395.21 |
| 2005/0111487 A1* | 5/2005 | Matta et al. | 370/468 |
| 2005/0237937 A1* | 10/2005 | Van Gestel | 370/235 |
| 2005/0286424 A1* | 12/2005 | Peeters et al. | 370/235 |
| 2006/0133346 A1* | 6/2006 | Chheda et al. | 370/352 |
| 2007/0291692 A1* | 12/2007 | Choi et al. | 370/330 |

FOREIGN PATENT DOCUMENTS

| | | |
|---|---|---|
| JP | 2000-224172 | 8/2000 |
| JP | 2004-538719 | 12/2004 |

* cited by examiner

METHOD FOR ESTIMATING AVAILABLE BANDWIDTH OF NETWORK

CLAIM OF PRIORITY

This application claims priority to that patent application entitled "Method For Estimating Available Bandwidth Of Network," filed in the Korean Intellectual Property Office on Aug. 31, 2004 and assigned Serial No. 2004-69164, the contents of which are incorporated herein by reference.

BACKGROUND OF THE INVENTION

1. Field of the Invention

The present invention relates to a network, and more particularly to a method for estimating an available bandwidth of a network.

2. Description of the Related Art

Various services requiring a quality of service ('QoS') with a predetermined level with respect to a transmission bandwidth, such as VOD (Video On Demand), VoIP (Voice over Internet Protocol) etc., have recently been provided. In order to transmit data according to these services through networks having various characteristics, it is necessary to estimate an available bandwidth of each network.

FIG. 1 is a block diagram illustrating communication apparatuses which are connected to each other through various links having different bandwidths in a network. Communication apparatuses 108 and 110 connected to each other in a network 100 typically communicate with each other via various links 102, 104, and 106 having different bandwidths. In FIG. 1, each of the heights of blocks representing the links 102, 104, and 106 conceptually expresses a size of a bandwidth of each relevant link. Also shown are dotted portions of the links 102, 104, and 106, which represent the respective bandwidths that are currently in use, and the remaining portions of the links 102, 104, and 106 represent the remaining bandwidths that are not in use.

When the communication apparatuses 108 and 110 communicate with each other via links 102, 104, and 106, having different bandwidths from each other, an available bandwidth of a link having the least bandwidth of the links 102, 104, and 106 through which data pass becomes the actual available bandwidth of the network 100 for the communication apparatuses 108 and 110. That is, in the example shown in FIG. 1, an available bandwidth of the link 106 being the least bandwidth of the links 102, 104, and 106 becomes the actual available bandwidth of the network 100 for the communication apparatuses 108 and 110.

According to the conventional techniques of estimating a bandwidth in a network as described above, only an approximate value of bandwidth can be found. According to these techniques, for example, TCP (Transmission Control Protocol)/UDP (User Datagram Protocol) packets are transmitted to a receiving-party communication apparatus 110 through the network 100 for a predetermined period of time. In this case, the packets are transmitted for a predetermined period of time while its transmission bandwidth is saturated with the packets more than the maximum available bandwidth of the network. Thereafter, the number of packets transmitted per unit time and the number of packets received per unit time in the receiving-party communication apparatus 110 are compared with each other, thereby estimating packet loss and an available bandwidth. That is, when a time period of packet transmission is 'T' and a size of periodic packets is 'S', a bandwidth is determined as 'S/T'.

However, when such a bandwidth estimation method is used, it is necessary to transmit/receive packets for a long time to increase the estimation accuracy. Therefore, a long time is necessary for estimating an available bandwidth according to the prior art. Moreover, a relevant bandwidth is occupied in a saturated state for the time that available bandwidth estimation is performed. This results in a waste of the network bandwidth.

Furthermore, the prior art method compares the number of packets transmitted per unit time with the number of packets received per unit time at the receiving-party communication apparatus. Thus, this method does not estimate the actual available bandwidth of the network in real time, but is merely an estimate of a momentary average bandwidth at a fixed time.

Hence, there is a need in the industry for a method for estimating network bandwidth that may be performed in substantially real-time and represents an estimate of an actual available bandwidth.

SUMMARY OF THE INVENTION

Accordingly, the present invention has been made to solve the above-mentioned problems occurring in the prior art and provides additional advantages, by providing an available bandwidth estimation method which can estimate an available bandwidth of a network at high speed while providing high accuracy.

One aspect of the present invention is to provide an available bandwidth estimation method that can estimate an actual available bandwidth of a network.

Another aspect of the present invention is to provide an available bandwidth estimation method that can reduce the bandwidth occupation rate required for estimating an available bandwidth of a network.

In one embodiment, there is provided a method for estimating an available bandwidth of a network. According to the method, a plurality of periodic time-stamp packets are transmitted to a receiving-party communication apparatus through the network at a currently-set test transmission rate, and then a changing tendency of transmission delay time differences between the time-stamp packets are checked on the basis of reception times at which the receiving-party communication apparatus have received the respective time-stamp packets.

When the transmission delay time differences are located outside a stable range and show a tendency to increase, the test transmission rate is set to a decreased value and the transmission of the time-stamped packets repeated at the decreased value. A check of the changing tendency of transmission delay time differences is again made.

When the transmission delay time differences are located outside a stable range and show a tendency to decrease, the test transmission rate is set to an increased value and the transmission of the time-stamped packets repeated at the increased value. A check the changing tendency of transmission delay time differences is again made.

A currently-set test transmission rate is determined as the available bandwidth when the transmission delay time differences are within the stable range.

BRIEF DESCRIPTION OF THE DRAWINGS

The above features and advantages of the present invention will be more apparent from the following detailed description taken in conjunction with the accompanying drawings, in which.

DETAILED DESCRIPTION

Hereinafter, an embodiment of a method for estimating an available bandwidth of a network according to the present invention will be described with reference to the accompanying drawings. For the purposes of clarity and simplicity, a detailed description of known functions and configurations incorporated herein will be omitted as it may obscure the subject matter of the present invention.

Figure 1:
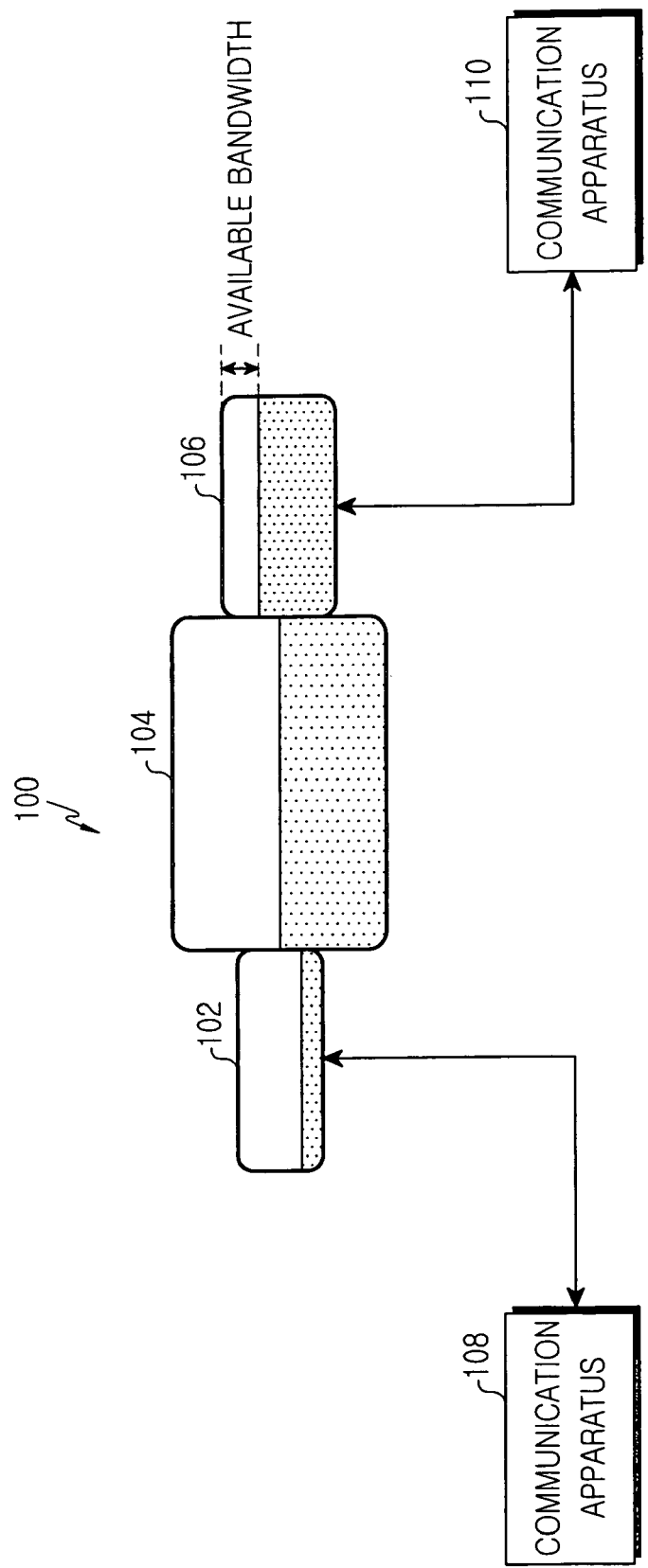
FIG. 1 is a block diagram illustrating communication apparatuses which are connected to each other through various links having different bandwidths in a network.
Figure 2:
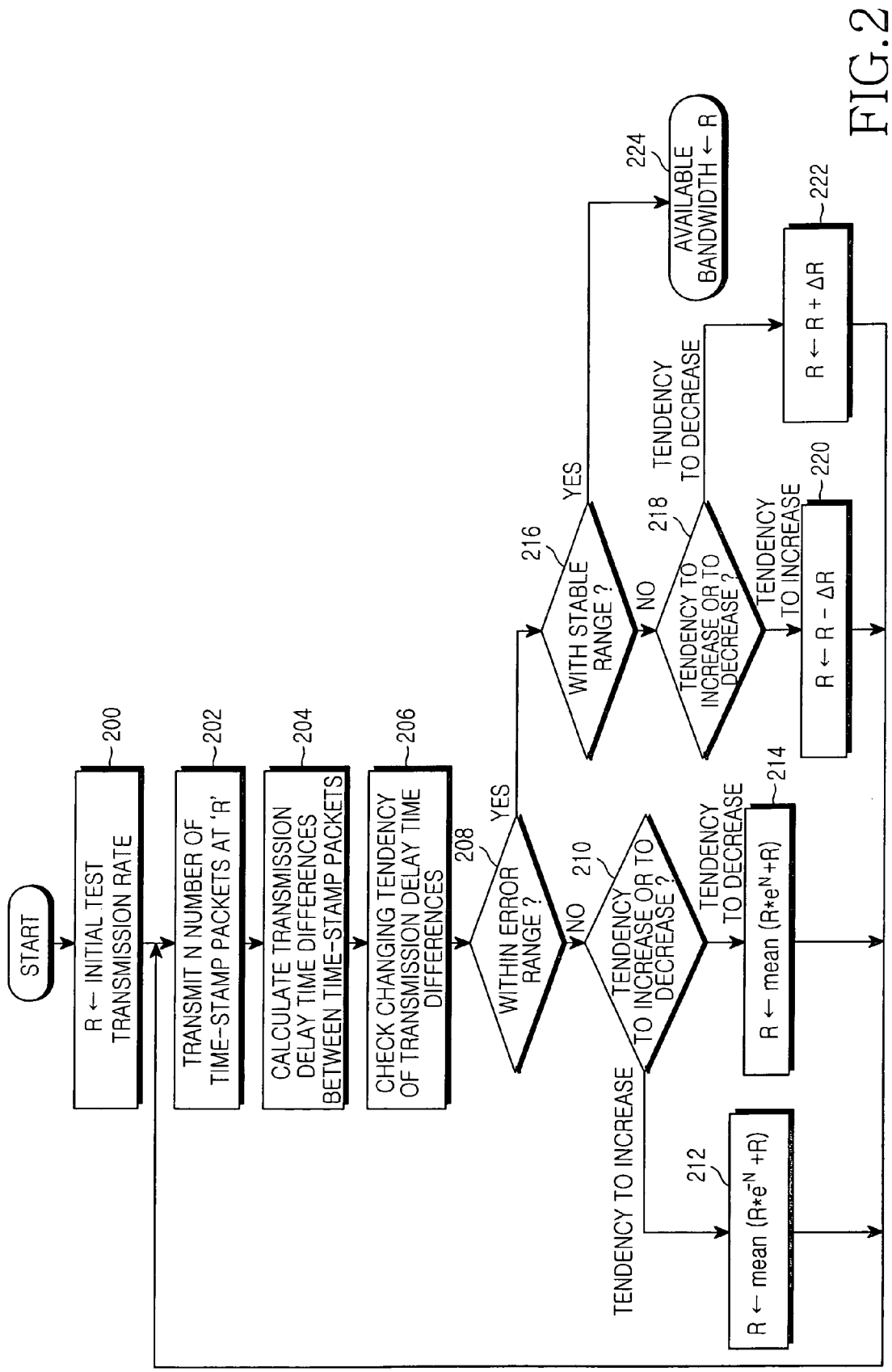
FIG. 2 is a flowchart illustrating a method of estimating an available bandwidth according to an embodiment of the present invention.

FIG. 2 is a flowchart illustrating a method of estimating an available bandwidth in network 100 shown in FIG. 1 according to an embodiment of the present invention. In step 200, communication apparatus 108 sets a predetermined initial test transmission rate as test transmission rate 'R'. The initial test transmission rate is set as an expected available bandwidth of the network 100.

Thereafter, the communication apparatus 108 transmits N number of periodic time-stamp packets at currently-set test transmission rate 'R' to communication apparatus 110 through network 100 (FIG. 1). In step 204, the communication apparatus 108 is notified of reception times, at which the communication apparatus 110 has received each of the time-stamp packets, from the communication apparatus 110, and calculates transmission delay time differences between the time-stamp packets on the basis of the respective reception times of the time-stamp packets. In step 206, the communication apparatus 108 checks a changing tendency of transmission delay time differences between the time-stamp packets.

Figure 3A:
FIGS. 3A and 3B are views for illustrating a case of decreasing a test transmission rate according to an embodiment of the present invention.
Figure 3B:
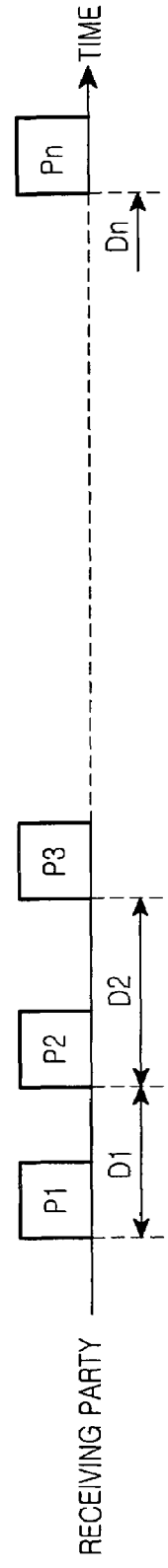

In this case, when test transmission rate 'R' is higher than the actual available bandwidth of the network 100, the transmission delay time differences show a tendency to increase as shown in FIGS. 3A and 3B. FIGS. 3A and 3B are views illustrating increase of the transmission delay time differences. That is, the difference values D1 to Dn between transmission delay times of the time-stamp packets P1 to Pn received in the communication apparatus 110 increase, as shown in FIG. 3B, when the communication apparatus 108 transmits N number of time-stamp packets P1 to Pn with a period of 'T' as shown in FIG. 3A. That is, FIGS. 3A and 3B shows an example of an increasing tendency in which the time interval D2, for example, between reception times of the time-stamp packets P2 and P3 becomes longer than the time interval D1 between reception times of the time-stamp packets P1 and P2.

Figure 4A:
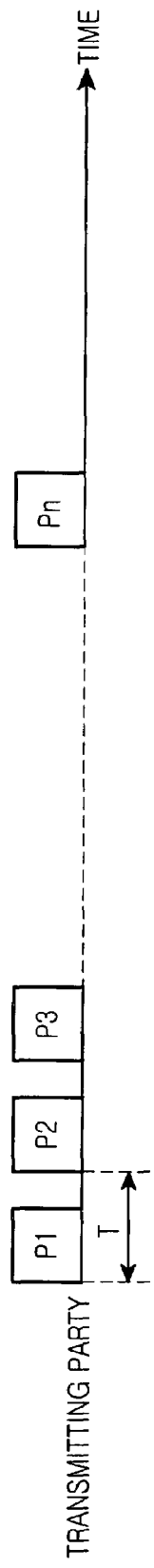
FIGS. 4A and 4B are views for illustrating a case of increasing a test transmission rate according to an embodiment of the present invention.
Figure 4B:
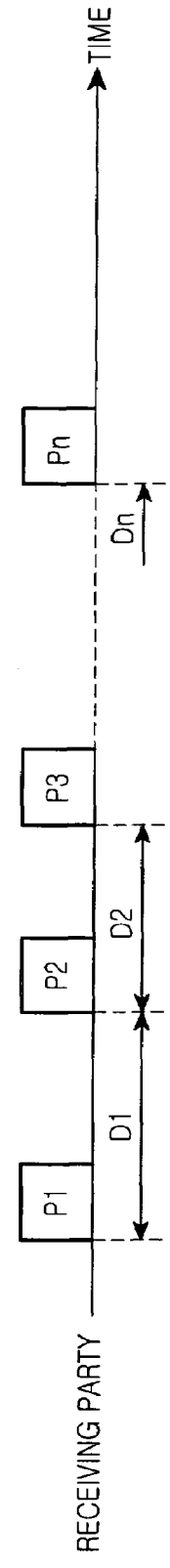

In contrast, when test transmission rate 'R' is lower than the actual available bandwidth of the network 100, the transmission delay time differences shows a tendency to decrease as shown in FIGS. 4A and 4B. FIGS. 4A and 4B are views illustrating decrease of the transmission delay time differences. That is, the difference values D1 to Dn between transmission delay times of the time-stamp packets P1 to Pn received in the communication apparatus 110 decrease as shown in FIG. 4B when the communication apparatus 108 transmits N number of time-stamp packets P1 to Pn with a period of 'T' as shown in FIG. 4A. That is, FIGS. 4A and 4B shows an example of a decreasing tendency in which the time interval D2, for example, between reception times of the time-stamp packets P2 and P3 becomes shorter than the time interval D1 between reception times of the time-stamp packets P1 and P2.

Therefore, until the changing tendency of transmission delay time differences shows a value within a predetermined stable range, the communication apparatus 108 decreases the value of test transmission rate 'R' when the transmission delay time differences shows a tendency to increase, and increases the value of test transmission rate 'R' when the transmission delay time differences shows a tendency to decrease. Consequently, the communication apparatus 108 can set the value of test transmission rate 'R' to converge within the stable range. In one aspect of the invention, test transmission rate 'R' set by such a method is an actual available bandwidth of the network 100. The stable range is a predetermined range for determining whether the transmission delay time differences converge within the stable range.

As described above, a transmitting party transmits multiple periodic time-stamp packets, and estimates an available bandwidth by increasing and decreasing a test transmission rate using the changing tendency of transmission delay time differences on the basis of reception times of a receiving party. In this manner, an estimate of the actual available bandwidth may be determined while reducing the time period required for the estimation and an occupancy of a relevant bandwidth.

In another aspect of the invention, the transmitting party 108 may be exponentially increase/decrease test transmission rate 'R' until test transmission rate 'R' is within an error range predetermined based on the stable range and then linearly increase/decrease the test transmission rate 'R' after test transmission rate 'R' is within the error range. In this case, it is possible to further reduce the time period required for the available bandwidth estimation. As would be appreciated, the error range may be predetermined and be a wider range than the stable range.

Thereafter, it is checked in step 206 that the changing tendency of transmission delay time differences and than it is checked in step 208 whether the transmission delay time differences are within the error range. As a result, if the transmission delay time differences are not within the error range, it is checked whether the difference values show increasing tendency or decreasing tendency in step 210.

As a result of the checking in step 210, if the transmission delay time differences show a tendency to increase as shown in FIG. 3B, the test transmission rate 'R' is determined by exponentially decreasing test transmission rate 'R' in step 212 and then the process returned to step 202. For example, in order to exponentially decrease test transmission rate 'R', test transmission rate 'R' may be set as 'mean $(R*e^{-N}+R)$'. That is, currently-set test transmission rate 'R' is multiplied by '$e^{-N}$', which is an exponential function, and then the average value of the resultant value of the multiplication and currently-set test transmission rate 'R' is set as new test transmission rate 'R', so that test transmission rate 'R' decreases exponentially.

In contrast, as a result of the checking in step 210, if the transmission delay time differences show a tendency to decrease as shown in FIG. 4B, the test transmission rate 'R' is determined by exponentially increasing test transmission rate 'R' in step 214, and then the process returns to step 202. For example, in order to exponentially increases test transmission rate 'R', test transmission rate 'R' may be set as 'mean (R*e^N+R)'. That is, currently-set test transmission rate 'R' is multiplied by 'e^N', which is an exponential function, and then the average value of the resultant value of the multiplication and currently-set test transmission rate 'R' is set as new test transmission rate 'R', so that test transmission rate 'R' increases exponentially.

Therefore, when transmission delay time differences are not within the error range, it is repeated to set the test transmission rate by exponentially increasing or decreasing the test transmission rate according to changing tendencies and then to again transmit time-stamp packets at set test transmission rate 'R', so that transmission delay time differences ultimately lie within the error range.

Thereafter, it is determined that transmission delay time differences are within the error range in step 208, the delay time differences are checked whether they are within the stable range in step 216. As a result, if the transmission delay time differences are not within the stable range, it is checked whether the difference values show a tendency to increase or a decreasing tendency in step 218.

As a result of the checking in step 218, if the transmission delay time differences show a tendency to increase as shown in FIG. 3B, the test transmission rate 'R' is determined by linearly decreasing current test transmission rate 'R' in step 220 and then the process returns to step 202. In this case, for example, in order to linearly decrease test transmission rate 'R', test transmission rate 'R' may be set as a value obtained by subtracting constant value 'ΔR' from current test transmission rate 'R'.

In contrast, as a result of the checking in step 218, if the transmission delay time differences show a tendency to decrease as shown in FIG. 4B, the test transmission rate 'R' is determined by linearly increasing current test transmission rate 'R' in step 222 and then the process returns to step 202. In this case, for example, in order to linearly increase the test transmission rate 'R', test transmission rate 'R' may be set as a value obtained by adding constant value 'ΔR' to current test transmission rate 'R'.

Therefore, when transmission delay time differences are within the error range but not within the stable range, the process is repeated to set the test transmission rate by linearly increasing or decreasing the test transmission rate according to the determined changing tendencies and then to again transmit time-stamp packets at the new test transmission rate 'R', until transmission delay time differences ultimately lie within the stable range.

When the transmission delay time differences are within the stable range, the process proceeds from step 216 to step 224 wherein the currently set test transmission rate 'R' is determined as the available bandwidth.

Of course, when N number of time-stamp packets are first transmitted at an initially-set test transmission rate 'R', transmission delay time differences may be within the stable range. In this case, without increasing or decreasing test transmission rate 'R', the process passes through steps 206, 208, and 216 and proceeds to step 224 in which the initially-set test transmission rate 'R' is determined as the available bandwidth.

While the present invention has been shown and described with reference to certain preferred embodiments thereof, it will be understood by those skilled in the art that various changes in form and details may be made therein without departing from the spirit and scope of the invention as defined by the appended claims.

Particularly, according to an embodiment of the present invention, test transmission rate 'R' exponentially increases or decreases before being within the error range and test transmission rate 'R' linearly increases or decreases after being within the error range until being within the stable range, so that it is possible to further reduce the time period required for the available bandwidth estimation.

However, as another embodiment of the present invention, it is possible to omit the setting step of the test transmission rate by increasing or decreasing the test transmission rate when transmission delay time differences are not within the error range. In this case, of course, although the time period required for the available bandwidth estimation is less shortened, it is still possible to reduce the time period required for the estimation and the occupancy of a bandwidth as compared to the prior art. Also, in this case, when transmission delay time differences are not within the stable range, it is possible to increase/decrease the test transmission rate exponentially or in still another scheme for the purpose of setting the test transmission rate by increasing/decreasing the test transmission rate.

As would be recognized, the processing described, herein, may be performed in a computing system or processor that may be any means, such as general purpose or special purpose system, or may be a hardware configuration, such as a laptop computer, desktop computer, a server, handheld computer, dedicated logic circuit, or integrated circuit. In one aspect of the invention, a processor may be selected from a group of Programmable Array Logic (PAL), Application Specific Integrated Circuit (ASIC), etc., which may be hardware "programmed" to include software instructions or code that provides a known output in response to known inputs. In one aspect, hardware circuitry may be used in place of, or in combination with, software instructions to implement the invention. The elements illustrated herein may also be implemented as discrete hardware elements that are operable to perform the operations shown using coded logical operations or by executing hardware executable code. Memories may be any semiconductor memory, such as PROM, EPROM, EEPROM or RAM, that is external to processor, and/or may be integrated with processor, i.e., cache.

In one aspect, the principles of the present invention may be implemented by computer readable code executed by processor. The code may be stored in the memory or read/downloaded from a memory medium, an I/O device or magnetic, optical media such as a floppy disk, a CD-ROM or a DVD, which are not shown.

Accordingly, the scope of the invention is not to be limited by the above embodiments but by the claims and the equivalents thereof.

What is claimed is:

1. A method for estimating an available bandwidth of a network, the method comprising the steps of:

transmitting a plurality of periodic time-stamp packets to a receiving-party communication apparatus, which is connected to the network, through the network at a currently-set test transmission rate;

checking a changing tendency of transmission delay time differences between the time-stamp packets on the basis of a transmission time of each respective packet of the plurality of time stamped packets versus a reception time at which the receiving-party communication apparatus has received each of the respective time-stamp packets and determining whether the changing tendency of the delay time differences is increasing or decreasing;

checking whether the transmission delay time differences between each respective transmitted and received packet is within an error range determined based on the error range determined being wider than a predetermined stable range;

setting the currently-set test transmission rate to an exponentially decreased value when the transmission delay time differences are located outside the error range and show a tendency to increase;

setting the currently-set test transmission rate to an exponentially increased value when the transmission delay time differences are located outside the error range and show a tendency to decrease;

checking whether the transmission delay time differences are within the stable range when the transmission delay time differences are within the error range;

setting the currently-set test transmission rate to a linearly decreased value when the transmission delay time differences are located outside the stable range and show a tendency to increase;

setting the currently-set test transmission rate to a linearly increased value when the transmission delay time differences are located outside the stable range and show a tendency to decrease;

determining the currently-set test transmission rate as the available bandwidth when the transmission delay time differences are within the stable range; and returning to the transmitting step after each of the setting steps.

2. A communication apparatus containing a processing system for estimating an available bandwidth of a network, the processing system comprising:

means for transmitting at a currently-set test transmission rate, a plurality of periodic time-stamp packets to a receiving-party communication apparatus via the network;

means for receiving from the receiving-party communication apparatus of reception times at which the receiving-party communication apparatus received the respective time-stamp packets;

means for determining transmission delay times on the basis of a transmission time of each respective packet of the plurality of time stamped packets versus a reception time at which the receiving-party communication apparatus has received each of the respective time-stamp packets for and determining whether the transmission delay time differences are within an error range determined being wider than a predetermined stable range and for determining whether the changing tendency of the delay time differences is increasing or decreasing;

means for adjusting the test transmission rate, wherein the rate is set to an exponentially decreased value when the delay times increase and an exponentially increased value when the delay times decrease when the delay times are located outside the error range;

means for determining whether the transmission delay time differences are within the predetermined stable range when the transmission delay time differences are within a predetermined error range;

means for adjusting test transmission rate, wherein the rate is set to a linearly decreased value when the delay times increase and a linearly increased value when the delay times decrease when the delay time differences are outside the stable range; and means for determining the currently-set transmission rate as the variable bandwidth when the transmission delay time differences are within the stable range.

3. The apparatus as claimed in claim 2, wherein the processing system further includes means for determining the currently-set test transmission rate as the available bandwidth when the transmission delay time differences are within the stable range.

4. The apparatus as claimed in claim 2, wherein the test transmission rate is increased or decreased based on an exponential factor.

5. The apparatus as claimed in claim 2, wherein the test transmission rate is increased or decreased based on a linear factor.

6. The apparatus as claimed in claim 5, wherein the linear factor is fixed.

7. The apparatus as claimed in claim 2, wherein the test transmission rate is increased or decreased based on an exponential factor.

8. The apparatus as claimed in claim 2, wherein the test transmission rate is increased or decreased based on a linear factor.

9. The apparatus as claimed in claim 8, wherein the linear factor is fixed.

10. The apparatus as claimed in claim 2, wherein said means is selected from the group consisting of: software instructions, hardware implemented software instructions, and hardware.

* * * * *